United States Patent Office 3,029,212
Patented Apr. 10, 1962

3,029,212
SYNTHETIC TANNING AGENT AND PROCESS FOR PREPARING SAME
Stanley Lipowski, Newark, and Charles A. Fetscher, Short Hills, N.J., assignors to Nopco Chemical Company, Harrison, N.J., a corporation of New Jersey
No Drawing. Filed Sept. 9, 1957, Ser. No. 682,616
17 Claims. (Cl. 260—29.3)

The present invention relates to new synthetic tanning agents and their preparation. More particularly the present invention relates to condensation products of mixtures of dihydroxy-diphenyl sulfones and highly sulfonated bis-phenols with formaldehyde, which products are highly superior tanning agents prepared in a novel manner.

It is known according to U.S. Patent No. 2,174,287 Guthke, September 26, 1939, to use a sulfone and a bis-phenol in tanning procedures. According to this patent, a sulfone solubilized and condensed under pressure and at temperatures above 100° C. with sodium sulfite and formaldehyde is mixed with a bis (hydroxy-phenyl) propane solubilized and condensed with sodium sulfite and formaldehyde at atmospheric pressure and at moderate temperatures. The resulting physical mixture may be applied to leather. It is also known according to Swiss Patent Nos. 246,989 and 252,302 to condense diaryl sulfones with sulfonated bi-phenyls under strongly acidic conditions until reaction is completed or under slightly alkaline conditions. These products are also useful in tanning procedures.

However, the present invention has brought about novel tanning agents which are not only different in composition from the tanning agents of the prior art, but which are greatly superior to the tanning agents of the prior art. They are useful as retanning agents for chrome tanned leather and as pretanning agents to form shrunken grain effects. These novel agents have good filling properties and are light fast. Leather so treated is very plump and has a very fast and nice grain. Such leather is further characterized by having higher tensile and stitch tear strengths when compared with leather treated with prior art tanning agents.

These novel tanning agents are obtained by condensing a mixture of a dihydroxy-diphenyl-sulfone and a highly sulfonated bis-phenol with formaldehyde. The condensation is carried out in three stages. The first stage involves condensation with formaldehyde in a very weakly alkaline medium, i.e., a pH of from about 8 to about 9 for about 4 to 5 hours. This is followed by a second condensation with formaldehyde in a neutral medium for about 2 to 4 hours. Finally condensation with formaldehyde is concluded in a weakly acidic medium at a pH of about 4 to 5 for about 4 to 5 hours. If desired, the first condensation may be carried out in a weakly acid medium and the third in a weakly basic medium. Throughout these three steps elevated temperatures e.g., from 95 to 105° C. are maintained. Preferably reflux temperatures of the reaction mixture are used. The final product is buffered to a pH of about 3 preferably with hydroxy-carboxylic acids such as glycolic acid and lactic acid.

We have found that our reaction procedures are critical in nature. By using the different pH mediums which bring about different rates of condensation, by introducing formaldehyde at the start of each new condensation stage which insures the presence of the proper amount of formaldehyde in each stage, by using weakly acid and weakly basic mediums and relatively mild temperatures, a product is obtained which is a mixture of a variety of polymerized molecules having different molecular sizes and structures. We have discovered that the character of such product makes it a superior syntan, in fact superior to the presently known syntans. Moreover, the conditions employed herein make the process very easy to control and to obtain reproducibility of the product.

It would appear that the reaction could be speeded up by using strongly acid and strongly basic mediums and even higher temperatures. However, products with considerably inferior tanning properties are obtained unless our process is followed.

Our sulfones have the following structure

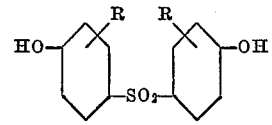

in which R may be —H or —CH₃. Examples of useful sulfones are dimethyl dihydroxy sulfone, dicresyl sulfone, or mixtures thereof. The cresol used in the preparation of dicresyl sulfone may be ortho, meta or para cresol or a commercial grade cresol which contains mixtures of the isomers of cresol. There are various ways to prepare these sulfones and the examples illustrate a preferred preparation. However, the present invention is not limited to any particular preparation. It is only necessary that the preparation used yields the desired sulfone.

The bis-phenol that we use has the following structure

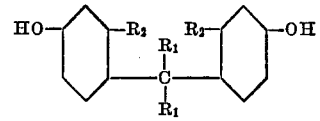

in which $R_1$ is —CH₃ or —CH₂CH₃ and $R_2$ is —H or —CH₃. Examples of such compounds are 2,2 bis (para hydroxy phenyl) propane and 2,2 bis (para hydroxy phenyl) butane. This material is highly sulfonated, i.e., to about 75 to 85% of the theoretical maximum degree of sulfonation for the disulfonic acid derivative thereof. Preferably it is sulfonated close to about 80%. Since the condensation process calls for weakly acid, neutral and weakly alkaline mediums, the bis-phenol disulfonic acid must be used in its neutralized form. This is obtained by neutralizing the acid with a base e.g., sodium hydroxide, potassium hydroxide, ammonium hydroxide, etc. The sulfonated bis-phenol will have the structure

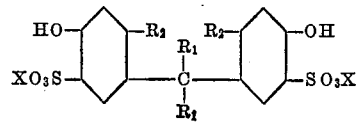

where $R_1$ and $R_2$ have the same meaning as previously given for the bis-phenol and X is a metal from the alkaline group such as sodium and potassium or it may be the ammonium group. As the sulfonating agents, 98% and 100% sulfuric acid may be used. However, the sulfonation procedure is not critical and any prior art procedure may be employed so long as the proper degree of sulfonation is achieved. Such procedure does not form a part of this invention. The molecular ratio of sulfone to bis-phenol can be varied somewhat but should not exceed one mole sulfone to one mole bis-phenol. However, as low as 0.75 mole sulfone may be used per mole of bis-phenol. The total quantity of formaldehyde may be varied slightly i.e., from about 1.5 to 2 moles per mole of sulfone or bis-phenol. The formaldehyde present in each of the three condensation stages may vary from 0.5 to 0.7 mole of formaldehyde based on each mole of either the bis-phenol or the sulfone. The formaldehyde is used preferably as formalin, which is an approximately 37% aqueous formaldehyde solution although it may be used in one of its polymeric forms such as paraformaldehyde, trioxane, etc. Additionally compounds liberating formaldehyde upon heating may be used, such as monomethylol dimethyl hydantoin.

In order to determine whether the final condensation product is suitable for use in tanning, it should satisfy the following criteria: it should be completely free from any excess formaldehyde, easily soluble in water and form a clear solution therein, it should be soluble in a 5% acetic acid solution and be immediately precipitated upon addition to a 10% sodium chloride solution or precipitated after a few minutes by addition to a 5% sodium chloride solution. The reaction may be represented as follows:

formula which covers the various condensation products which are obtained as a result of the condensation reaction.

The product when recovered and buffered to a pH of about 3.2 is in an aqueous solution of a concentration from about 50 to 60% by weight and may be used directly in tanning procedures. If desired, the product may be isolated e.g., by drum or spray drying or by salting out the solid material e.g., with heavy brine.

As indicated previously the product is an excellent synthetic tanning agent with unlimited stability in solution form. It can be used as a retanning agent for chrome retan, as a bleaching agent, as a dispersing agent in

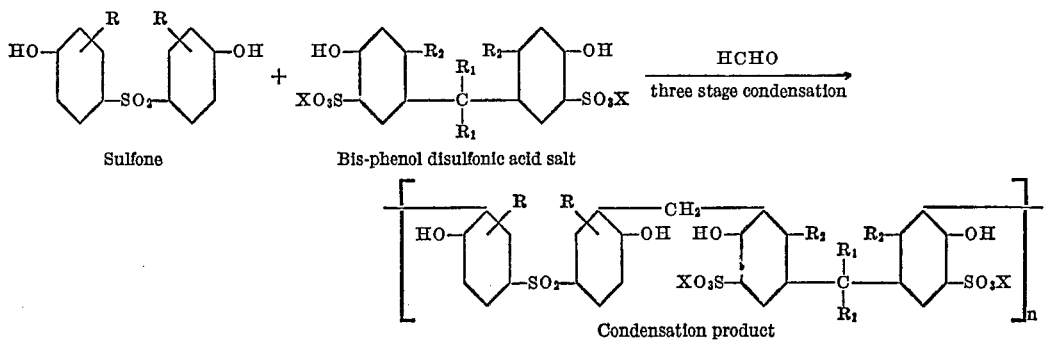

in which R is —H or —CH$_3$, R$_1$ is —CH$_3$ or —CH$_2$CH$_3$, R$_2$ is —H or —CH$_3$, X is a metal from the alkaline group, or ammonium, and $n$ is an integer between about 3 and 4. The degree of sulfonation indicated in the preceding structural formula of the bis-phenol and of the final condensation product by the presence of two —SO$_3$X groups per bis-phenol unit represents an average since some molecules may have only one —SO$_3$X group while others may have two or more.

Since phenol and ortho, meta, and para cresols may be used alone or in admixture with each other in varying proportions to form the sulfone reactant, the sulfone may be represented by the following configurations as well as mixtures thereof although it is understood that these are not all of the possible sulfones that can be derived from the preceding phenol and cresols:

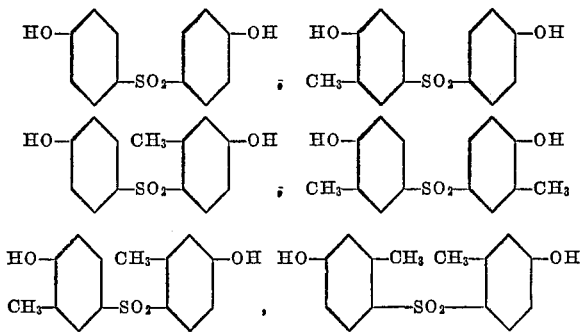

Hence, the sulfone portion of the final condensation product may be derived from any of the above sulfones or mixtures thereof. This is demonstrated, for instance, by Example III in which bis-phenol is condensed with a sulfone mixture in which the sulfones are (1) dihydroxy diphenyl sulfone and (2) a mixture of isomeric cresyl sulfones. Also the bis-phenol disulfonic acid salt may be considered a mixture of salts since the degree of sulfonation previously indicated represents an average value. Also, as stated before, the condensation product is actually a mixture of polymers of different chain lengths. It is obvious therefore, that the syntan molecule need not be identical in each of its units as represented by the formula for the condensation product in the preceding equation. Hence, the above formula represents a basic vegetable tanning processes, for shrunken grain tanning processes and for many other purposes. On chrome retan, the product gives a full, plump leather with a soft touch and good hand.

For a fuller understanding of the present invention reference is made to the following examples which are given for purposes of illustration only and are not to be construed in a limiting sense. Unless otherwise stated all parts are given by weight.

*Example I*

A. *Preparation of sulfone.*—To 100 parts of crude phenol were added 50 parts of 100% sulfuric acid. The resulting mixture was stirred for 2 hours at 100° C. Then 10 parts of chlorobenzene were added and the temperature raised gradually to 150° C. The water from the reaction was thereby azeotropically removed with the chlorobenzene during heating for 5 hours. The reaction mass was then neutralized with 25 parts of a 40% sodium hydroxide solution and the remaining solvent (chlorobenzene) was removed by addition of 30 parts water followed by distillation. The resulting dihydroxy diphenyl sulfone was in the form of a wet paste having a concentration of 70–75% by weight.

B. *Preparation of the sulfonated bis-phenol.*—To 100 parts of 2,2 bis (para hydroxy phenyl) propane were added 80 parts of 98% sulfuric acid. This mixture was heated at a temperature of 110° C. for 5 hours. The resulting product was then diluted with 150 parts of water and neutralized with 90 parts of a 45% sodium hydroxide solution.

C. *Condensation with formaldehyde.*—The entire quantities of the products of A and B, i.e., the sulfone and bis-phenol were admixed, the pH adjusted to 8 by addition of sodium hydroxide, and 20 parts of a 37% by weight aqueous solution of formaldehyde added. This mixture was refluxed for 4 hours. Then lactic acid was added to adjust the pH to about 7.0, 20 parts more of formaldehyde added and the mixture refluxed for 3 hours. Thereafter 20 parts of lactic acid were added to adjust the pH to about 4.5 and 20 more parts of formaldehyde introduced. Reflux was carried out for 5 additional hours. The pH was finally adjusted with 60 parts glycolic acid to about 3.2. The product was an aqueous solution containing about 52% solids.

Example II

A. Preparation of the sulfone.—A mixture of 50 parts cresol and 50 parts phenol was prepared. The cresol was a technical grade containing 54% meta cresol, 29% para cresol and the remainder other phenols including ortho cresol and xylenols. To this mixture was added 50 parts of 100% sulfuric acid. This new mixture was stirred for one hour at a temperature of 110° C. Chlorobenzene was added, and the temperature was raised to 150° C. thereby removing azeotropically the water formed during reaction. After heating for 4 hours, the reaction mass was cooled and neutralized with a dilute sodium hydroxide solution. The solvent was removed by addition of 40 parts of water and distillation. In this manner, a mixed sulfone in the form of a 60 to 65% by weight of a wet paste was obtained.

B. Preparation of the bis-phenol.—To 120 parts of 2,2 bis (para hydroxy phenyl) propane was added 85 parts of 100% sulfuric acid. Stirring at a temperature of 110° C. for 4 hours was carried out. The product was diluted with 150 parts of water and neutralized with 90 parts of a 45% sodium hydroxide solution.

C. Condensation with formaldehyde.—60 parts of the sulfone of part A were admixed with 20 parts of the bis-phenol of part B. Thereafter condensation was carried out in the same manner as indicated in Example I, part C.

Example III

This example is directed to a condensation product obtained from a mixture of sulfones.

A. Preparation of sulfone.—The sulfones of Examples IA and IIA were prepared and admixed in a weight ratio of 1:1. This mixture was partially neutralized with sodium hydroxide to a pH of 4.0 to 5.0.

B. Preparation of bis-phenol.—The bis-phenol of Example IB was prepared and partially neutralized with sodium hydroxide to a pH of 4.0 to 5.0.

C. Condensation with formaldehyde.—60 parts of the product of part A and 22 parts of the product of part B were mixed together, the pH being about 4.5. To this mixture of weakly acid intermediates, 25 parts of formaldehyde were added and the mixture refluxed for 5 hours. The product was then neutralized with sodium hydroxide to a pH of 7.0. Then 22 additional parts of formaldehyde were added and reflux carried out for 4 hours. The pH was then adjusted to 8.0 with sodium hydroxide, 22 more parts of formaldehyde added and the mixture refluxed for a final 4 hours. The pH was adjusted to 3.4 with 12 parts glycolic acid.

The following examples illustrate the use of our novel synthetic tanning agents in treatment of leather.

Example IV

This example is directed to a synthetic retan of leather with our novel agent.

Chrome tanned cowhides were washed for 30 minutes and neutralized with 1% ammonium bicarbonate, and washed again for a few minutes. The hides were placed in a drum containing 300% water based on the shaved (blue) weight of the hides and 12% by weight thereof of the product from Example I was added. The drum was then run for 2 hours and the hides washed, fat-liquored and finished in the usual manner. A very plump and pliable piece of leather resulted with a fast and smooth grain and having a very high tensile and stitch tear strength.

Example V

This example is directed to shrunken grain tanning.

Pickled calfskins were placed in a drum containing 120% water based on the pickled weight of the skins and treated with 20% by weight of the skins of the synthetic tanning agent of Example I. The drum was rotated for 2 hours. The synthetic tanning agent was taken up very well by the skins and the grain was shrunken satisfactorily. The exhausted liquor was drained and the skins washed in 300% water bath based on the weight of the skins for five minutes. To a new bath containing 100% water and the skins, 8% by weight of the skins of Tanolin R (a chrome tanning agent which is a dry chrome salt 33% basicity and 25% $Cr_2O_3$ content) was added to complete the tanning and the drum rotated for 5 hours. A solution of 1% ammonium bicarbonate dissolved in 10% water was added slowly during ½ hour. The drum was rotated for an additional hour. The skins were thereafter horsed for 48 hours, then washed, neutralized, dried, fat-liquored and finished in the usual manner. The resulting leather was found to be very soft with a nice pattern.

Example VI

Pickled calfskins were treated in a tanning drum containing 100% water with 10% by weight of the skins of the product from Example I for 2 hours in order to shrink the grain. The liquor was drained and the hides washed with 500% water for 5 minutes. In a new bath containing 100% water, 5% of a cationic aminoplast resin (50% solids base) was added to fix the shrunken pattern and the drum rotated for 1 hour. The liquor was drained and the skins washed for 5 minutes with 500% water. In a new bath the skins were chrome tanned with 10% Tanolin R to complete the tanning. The initial pH of the chrome bath was 3.4. After 4 hours the chrome solution which showed now a pH of 2.5 was neutralized slowly with 1% $NH_4HCO_3$ solution and the drum rotated for an additional hour. The final pH was 4.0. The calfskins were finished in the usual manner. The shrunken grain pattern was fixed very well. The leather was firm, but not harsh. Its firmness naturally can be adjusted if desired by variations in fat-liquoring.

Such expressions as percent water, percent Tanolin R, etc., as used in the last three examples, mean percent by weight of the skins in accordance with the practice in the art.

As the foregoing has demonstrated, novel synthetic tanning agents have been described which have been found to be superior to the prior art agents. It will be appreciated that various modifications can be made in this invention as described above and such are within the scope of the present invention as defined in the appended claims.

Having described our invention, what we claim as new and desire to secure by Letters Patent is:

1. A process for obtaining synthetic tanning agents comprising mixing together from about 0.75 to one mole of at least one sulfone of the formula

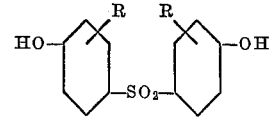

wherein R is selected from the group consisting of —H and —$CH_3$, with one mole of a disulfonic acid salt of a bis-phenol of the formula

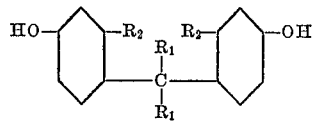

in which $R_1$ is selected from the group consisting of —$CH_3$ and —$CH_2CH_3$ and $R_2$ is selected from the group consisting of —H and —$CH_3$ and which is sulfonated to an average degree of about between 75 and 80% of the theoretical amount of the disulfonic acid salt and thereafter condensing the resulting mixture with from about 1.5 to 2 moles of formaldehyde in three stages by (1) reacting said mixture with from 0.5 to 0.7 mole of formaldehyde for about 4 to 5 hours in a weakly acid solution having a pH of from about 4 to 5, thereafter (2) reacting said mixture with from about 0.5 to 0.7 mole of formaldehyde for about 2 to 4 hours in neutral solution and (3) finally reacting said mixture with from about 0.5 to 0.7 mole of formaldehyde for about 4 to 5 hours in a weakly basic solution having a pH of from about 8 to 9.

2. A process for obtaining synthetic tanning agents comprising mixing together from about 0.75 to one mole of at least one sulfone of the formula

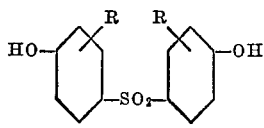

wherein R is selected from the group consisting of —H and —$CH_3$, with one mole of a disulfonic acid salt of a bis-phenol of the formula

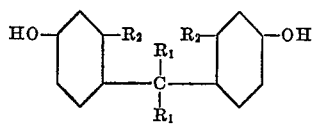

in which $R_1$ is selected from the group consisting of —$CH_3$ and —$CH_2CH_3$ and $R_2$ is selected from the group consisting of —H and —$CH_3$ and which is sulfonated to an average degree of about between 75 and 80% of the theoretical amount of the disulfonic acid salt and thereafter condensing the resulting mixture with from about 1.5 to 2 moles of formaldehyde in three stages by (1) reacting said mixture with from 0.5 to 0.7 mole of formaldehyde for about 4 to 5 hours in a weakly basic solution having a pH of from about 8 to 9, thereafter (2) reacting said mixture with from about 0.5 to 0.7 mole of formaldehyde for about 2 to 4 hours in neutral solution and (3) finally reacting said mixture with from about 0.5 to 0.7 mole of formaldehyde for about 4 to 5 hours in a weakly acid solution having a pH from about 4 to 5.

3. The process of claim 2 in which said bis-phenol is sulfonated to an average degree of about 80%.

4. The process of claim 2 in which both substituents R of said sulfone are —H and said bis-phenol is 2,2 bis (para hydroxy phenyl) propane.

5. The process of claim 2 in which both substituents R of said sulfone are —$CH_3$ and said bis-phenol is 2,2 bis (para hydroxy phenyl) propane.

6. The process of claim 2 in which one substituent R of said sulfone is —H and the other is —$CH_3$ and said bis-phenol is 2,2 bis (para hydroxy phenyl) propane.

7. The process of claim 2 in which the aromatic rings of said sulfone are derived from a mixture of ortho, meta, and para cresols and said bis-phenol is 2,2 bis (para hydroxy phenyl) propane.

8. The process of claim 2 in which said sulfone is a mixture of (1) dihydroxy diphenyl sulfone and (2) a dicresyl sulfone, the aromatic rings of which are derived from a mixture of ortho, meta, and para cresols and said bis-phenol is 2,2 bis (para hydroxy phenyl) propane.

9. As a synthetic tanning agent, a mixture of condensation products having the basic formula

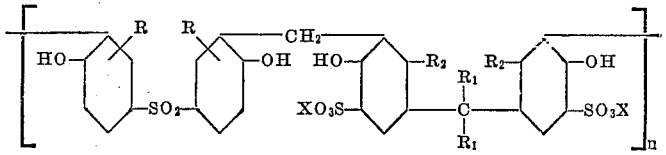

in which R is selected from the group consisting of —H and —$CH_3$, $R_1$ is selected from the group consisting of —$CH_3$ and —$CH_2CH_3$, $R_2$ is selected from the group consisting of —H and —$CH_3$, X is selected from the group consisting of alkali metals and ammonium, $n$ represents an average positive integer between about 3 and 4 and the degree of sulfonation of said agent being an average of about 75% to 85% based upon the bis-phenol disulfonic acid salt portion of the molecule.

10. The synthetic tanning agent of claim 9 in which both substituents R are —H, both substituents $R_1$ are —$CH_3$ and both substituents $R_2$ are —H.

11. The synthetic tanning agent of claim 9 in which both substituents R are —$CH_3$, both substituents $R_1$ are —$CH_3$ and both substituents $R_2$ are —H.

12. The synthetic tanning agent of claim 9 in which one substituent R is —H and the other is —$CH_3$, both substituents $R_1$ are —$CH_3$ and both substituents $R_2$ are —H.

13. The synthetic tanning agent of claim 9 in which said degree of sulfonation is about 80%.

14. The synthetic tanning agent of claim 9 in which the aromatic rings of the sulfone portion of the molecule are derived from a mixture of ortho, meta, and para cresols.

15. The synthetic tanning agent of claim 9 in which the sulfone portion of the molecule is derived from a mixture of (1) di-hydroxy di-phenyl sulfone and (2) a mixture of isomeric dicresyl sulfones.

16. A synthetic tanning agent comprising an aqueous solution of a mixture of condensation products having the basic formula

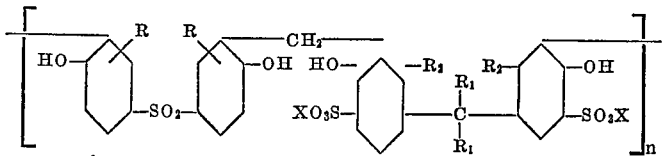

in which R is selected from the group consisting of —H and —$CH_3$, $R_1$ is selected from the group consisting of —$CH_3$ and —$CH_2CH_3$, $R_2$ is selected from the group consisting of —H and —$CH_3$, X is selected from the group consisting of alkali metals and ammonium, $n$ represents an average positive integer between about 3 and 4 and the degree of sulfonation of said agent being an average of about 75 to 85% based upon the bis-phenol disulfonic acid salt portion of the molecule.

17. The synthetic tanning agent of claim 16 in which said tanning agent is present in an amount of about 50 to 60% by weight of the solution and said solution is buffered to a pH of about 3.2.

References Cited in the file of this patent
UNITED STATES PATENTS

| | | |
|---|---|---|
| 1,988,985 | Schäfer | Jan. 22, 1935 |
| 2,129,553 | Russell et al. | Sept. 6, 1938 |
| 2,174,287 | Guthke | Sept. 26, 1939 |
| 2,268,091 | Niedercorn et al. | Dec. 30, 1941 |
| 2,522,569 | Day et al. | Sept. 19, 1950 |

FOREIGN PATENTS

| | | |
|---|---|---|
| 518,858 | Great Britain | Mar. 8, 1940 |

OTHER REFERENCES

Ser. No. 237,057, Greth (A.P.C.), published Apr. 20, 1943.